No. 719,103. PATENTED JAN. 27, 1903.
G. H. FOLLOWS.
VARIABLE SPEED MECHANISM.
APPLICATION FILED JULY 14, 1902.
NO MODEL.
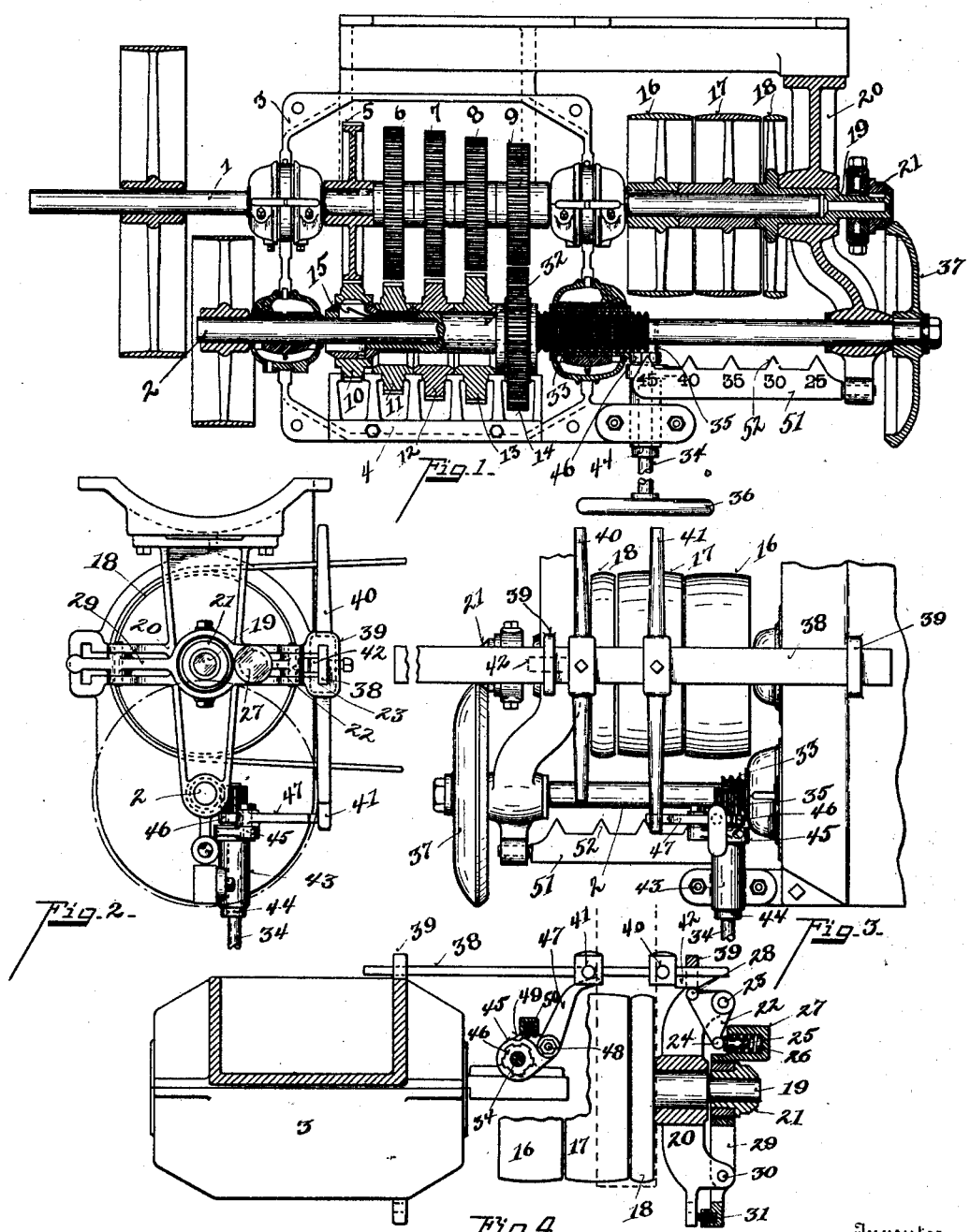

UNITED STATES PATENT OFFICE.

GEORGE H. FOLLOWS, OF PITTSBURG, PENNSYLVANIA, ASSIGNOR TO THE LODGE & SHIPLEY MACHINE TOOL COMPANY, OF CINCINNATI, OHIO, A CORPORATION.

VARIABLE-SPEED MECHANISM.

SPECIFICATION forming part of Letters Patent No. 719,103, dated January 27, 1903.

Application filed July 14, 1902. Serial No. 115,455. (No model.)

*To all whom it may concern:*

Be it known that I, GEORGE H. FOLLOWS, a citizen of the United States, residing at 331 South Highland avenue, Pittsburg, in the county of Allegheny and State of Pennsylvania, have invented certain new and useful Improvements in Variable-Speed Mechanism, of which the following is a specification.

My invention relates to the provision of a slowing-up device to be used in connection with that class of variable-speed devices in which a sliding clutch is employed to fix any selected one of a plurality of differently-diametered gear-wheels to its shaft. In this class of variable-speed devices the fixing of any of the said loose gears to turn with this shaft must be effected while the gears are in motion, and hence if the gears are high-speeded or rotated under working strain there is a severe jar either to the teeth of the intermeshing gears or to the key of the clutch.

The objects of my invention are, first, to provide a means for slowing up the speed of the shaft on which the clutch slides, so that the engagement and disengagement of the gears are at all times made at a low speed; second, to provide a locking device for locking the clutch in selected position of engagement and unlocking it for shifting; third, the provision of a belt-shifting device simultaneously operating both the slowing-up device and the locking mechanism.

The other features of my invention are more fully set forth in the description of the accompanying drawings, making a part of this specification.

Figure 1 is a central vertical section of my device. Fig. 2 is an end view of the same. Fig. 3 is a rear elevation of Fig. 1. Fig. 4 is a top plan view, partly in section.

1 represents the first shaft, relatively shown as a driving-shaft. 2 represents the second shaft, relatively shown as a driven shaft. 3 represents brackets in which these shafts are journaled.

4 represents the housing or casing on which the gears on shaft 2 are seated normally eccentric to the shaft and out of mesh with the opposite gear-wheels.

5, 6, 7, 8, and 9 represent the gear-wheels of different diameters fixed on the shaft 1. 10, 11, 12, 13, and 14 represent correspondingly-disposed gear-wheels on shaft 2.

15 represents a clutch on shaft 2, the object of which is to lift any one of the gears from shaft 2 into intermesh with its opposite gears and at the same time to fix the said selected gear to turn with shaft 2.

So far the previously-described devices are common to the patent issued to William L. Schellenbach, September 17, 1901, No. 683,003, my invention being shown as applied to this form of variable-speed device for convenience of illustration.

16 17 18 represent pulley-wheels on shaft 1. Pulley 16 is a tight or driving pulley fixed to shaft 1. 17 is an idle pulley, loosely mounted on shaft 1. 18 represents a loose pulley fixed on sleeve 19, which sleeve 19 turns loosely on shaft 1. As shown, the shaft 1 is inside of the supporting-bearing 20, and the sleeve 19 is extended through and projected beyond said bearing 20. The projecting end of this sleeve is splined. 21 represents a friction-disk feathered to the said splined sleeve 19, so as to turn therewith and slide thereon. The said transmitting-wheel 21 is normally held in disengagement by means of the following devices.

22 represents a bell-crank lever pivoted at 23 to the supporting structure, and at 24 it bears against a pin 25, which pin is surrounded by spring 26 with a little cup or casing 27, secured to the hub of the friction-disk 21.

28 represents the upper or tripping end of the bell-crank lever 22. 29 represents an oppositely-disposed lever pivoted at 30 to the supporting structure, one end of which lever engages the hub of the friction-disk 21. The other end of said lever 29 engages the spring 31 in bearing with the supporting structure. Therefore these two spring-actuated levers 22 and 29 normally hold the friction-disk in its disengaged position, and when the lever 22 is tripped the springs yield, allowing the disk to be moved outwardly into the engaged position.

The clutch member 15 is mounted on a sleeve 32, which slides on shaft 2. 33 represents rack-teeth formed in the said sleeve.

34 represents an operating-rod journaled in the supporting structure, at the upper end of which is a pinion 35, the teeth of which engage the teeth of the rack 33.

36 represents a hand-wheel on the lower end of rod 34.

37 represents a transmitting-wheel on the outer end of shaft 2, adapted to be engaged and rotated by the said wheel 21 on shaft 1.

38 represents a belt-shifting bar which slides in the loops or brackets 39 on top of the supporting structure. This belt-shifter is operated by an ordinary lever-handle extending downwardly like ordinary belt-shifters and is not shown in the drawings, as any means for shifting the bar 38 will answer. The belt passes between the cross-bars 40 and 41, as indicated in dotted lines, Fig. 4. On the appropriate end of the belt-shifting rod 38 is a shoulder or lug 42, the further end of which is provided with a bevel or incline adapted to engage the upper end 28 of the bell-crank 22 for tripping the said lever and shifting the said disk 21. Thus it will be seen that when the belt is shifted to the pulley 18, being the loose pulley, the bar 38, through the lug 42 and bell-crank lever 22, shifts the transmitting-wheel 21 into engagement with the transmitting-wheel 37, so that the rotation of the sleeve 19 on shaft rotates at a relatively slow speed the shaft 2.

The transmitting-wheels 21 and 37 are shown as beveled friction-disks as a preferred form, though other forms of transmitting-wheels, gears, &c., may be regarded as equivalents; also, the disk 21 is relatively much smaller in diameter than the disk 37, as it is desired to give shaft 2 a lower speed.

43 represents a journal in the upper end of the rod 34.

44 represents a journal-sleeve, on the end of which is a plate-flange support 45. Resting upon this plate and fixed to the rod 34 is a ratchet-wheel 46. 47 represents a lever pivoted to the supporting structure at 48 and having a pawl adapted to engage into the teeth of said ratchet-wheel 45. 50 represents a spring mounted on the supporting structure bearing against said pawl 49 to hold the same normally engaged with the teeth of the ratchet-wheel and also to hold the outer end of the lever 47 in its forward position. The lower end of the cross-bar 41 is projected so that in its path of travel it intercepts and trips the end of the lever 47, so as to turn the said lever on its pivot, disengaging the pawl from the ratchet.

51 represents an index under the shaft 2 and parallel therewith, having the indicating teeth or points 52. The last tooth on the rack constitutes a marker on the sliding clutch, which when adjusted opposite to any one of the teeth of the index indicates the speed value obtainable at that particular point of engagement.

It is apparent from the foregoing description that when the belt is shifted on the loose pulley 18 the friction-disk 21 is rotated and slid over into engagement with the disk 37 for imparting a slow speed to the shaft 2. At the same time the engagement of the cross-bar 41 with the lever 47 releases the pawl from the ratchet, so that the rod 34 is free to be turned for shifting the clutch. It is equally obvious that shifting the belt on the tight pulley 16 locks the clutch in this particular position, engaging and disengaging the slowing-up device. Thus no matter what changes are being made the gears on shaft 1 remain idle, and the revolving clutch on shaft 2 is revolved at a slow speed to avoid any possible jars or strains either on the teeth of the gears while intermeshing or to the key of the clutch. By this improvement the speed device can only be actuated to change the speed as the power is off of the tight pulley and the belt is on the loose pulley, which controls the slowing-up mechanism. This improvement in addition to being perfectly simple and convenient renders the device perfectly safe and free from weakness.

It is desirable that the shifting clutch should only be operated when it is directly in the middle of a particular pulley-bore, so that the clutch registers perfectly with the gear-wheel to be raised into position. In order to do this, the ratchet-wheel is spaced in such a manner that when the pawl is in engagement therewith the clutch is in proper position within the pulley-bore. Thus the clutch is not only locked against movement when the power is on, but it can only be actuated when it is slid longitudinally on this shaft to the exact position it should occupy at the time the particular engagement is to be made.

Having described my invention, I claim—

1. In a variable-speed device, a first and a second shaft, a plurality of different-diametered gear-wheels fixed to the first shaft, a plurality of different-diametered gears loosely disposed on the second, a sliding clutch on the second shaft adapted to fix any loose gear to its shaft, a tight and a loose pulley on said first shaft, a relatively small diametered transmitting-wheel rotated by said loose-pulley wheel, a relatively greater diametered transmitting-wheel on the second shaft, adapted to be rotated by said smaller wheel, and means for shifting said clutch when the belt is on the loose pulley, whereby said second shaft is driven at a relatively slow speed while the clutch is being shifted, substantially as specified.

2. In a variable-speed device, a first and a second shaft, a plurality of different-diametered gear-wheels fixed to the first shaft, a plurality of different-diametered gear-wheels loosely disposed on the second shaft, a sliding clutch on the second shaft adapted to fix any loose gear to its shaft, a tight and loose pulley on the first shaft, a collar on which the loose pulley is mounted, a relatively small diametered transmitting-wheel splined on said collar, means for shifting the belt between said pulleys, a shifting device for the small-diametered transmitting-wheel and a locking device for said sliding clutch adapted to be actuated by the belt-shifter to simultaneously unlock the clutch and shift the small-diametered transmitting-wheel into engagement with the larger-diametered transmitting-wheel when the belt is shifted to the loose pulley, and vice versa, substantially as specified.

3. In a variable-speed device, a first and a second shaft, a plurality of different-diametered gear-wheels fixed to the first shaft, a plurality of different-diametered gear-wheels loosely mounted on the second shaft, a sliding clutch on the second shaft adapted to fix any loose gear to its shaft, a loose pulley on the first shaft, a sleeve on which the loose pulley is mounted, a small transmitting-wheel on the sleeve, a large transmitting-wheel on the second shaft, the said small wheel being adapted to be slid on the first shaft to and from engagement with the larger transmitting-wheel, a rack, hand-wheel and pinion for operating the sliding clutch, a pawl-and-ratchet mechanism for locking said hand-wheel against rotation, a belt-shifter, connections between said shifter and said movable transmitting-wheel, and connections between said belt-shifter and said locking mechanism, whereby, when the belt is shifted to the loose pulley, the transmitting-wheels are engaged and the locking mechanism disengaged, whereby the clutch can be operated while the second shaft is being driven at a relatively slow speed, and when the belt is shifted to the tight pulley, the transmitting-wheels are disengaged and the clutch is locked against rotation in its selected position, substantially as specified.

4. In a variable-speed device, a first and a second shaft, a plurality of different-diametered gear-wheels fixed to the first shaft, a plurality of different-diametered gear-wheels loosely disposed on the second shaft, a sliding clutch on the second shaft adapted to fix any loose gear to its shaft, a rack for the clutch, a hand-wheel, shaft and pinion for operating said rack, a tight and loose pulley on the first shaft, a small friction-disk on the end thereof, a larger friction-disk on the second shaft, a belt-shifter and connections for engaging said friction-disks when the belt is on the loose pulley, and vice versa, substantially as specified.

5. A driving-shaft, a plurality of different-diametered gear-wheels fixed thereon, a driven shaft, a plurality of different-diametered gear-wheels loosely mounted thereon, a clutch on the driven shaft, means for sliding said clutch, a tight and loose pulley on the driving-shaft, a belt-shifter and a slowing-down mechanism consisting of transmitting-wheels adapted to be engaged when the belt is on the loose pulley, whereby the driven shaft is rotated slowly while the driving-shaft is idle, substantially as specified.

In testimony whereof I have hereunto set my hand.

GEORGE H. FOLLOWS.

Witnesses:
OLIVER B. KAISER,
IDA J. LUCAS.